United States Patent [19]
Harthill et al.

[11] 3,867,712
[45] Feb. 18, 1975

[54] ADAPTIVE FILTER

[75] Inventors: William P. Harthill; Henry Van Calcar, both of Seattle, Wash.

[73] Assignee: Honeywell Inc., Minneapolis, Ind.

[22] Filed: June 28, 1972

[21] Appl. No.: 266,906

[52] U.S. Cl. ............ 340/6 R, 114/144 R, 333/17 R
[51] Int. Cl. .............................................. G01v 1/00
[58] Field of Search ........ 340/5 R, 6 R; 114/144 R, 114/144 A; 333/17 R, 75 R; 328/167, 168, 169

[56] References Cited
UNITED STATES PATENTS

| | | | |
|---|---|---|---|
| 2,597,520 | 5/1952 | O'Brien | 328/168 |
| 3,336,572 | 8/1967 | Paull et al. | 340/6 R |
| 3,500,025 | 3/1970 | Moulin et al. | 340/6 R |
| 3,505,577 | 4/1970 | Hirokawa | 114/144 R |
| 3,588,752 | 6/1971 | Hirshfield | 333/17 |
| 3,588,796 | 6/1971 | Armistead et al. | 340/6 R |
| 3,604,907 | 9/1971 | Wesner | 114/144 R |
| 3,668,617 | 6/1972 | Brainard | 340/5 R |
| 3,696,282 | 10/1972 | Hirokawa | 114/144 R |

Primary Examiner—Maynard R. Wilbur
Assistant Examiner—T. M. Blum

[57] ABSTRACT

An adaptive filter for attenuating signal components in a frequency band having independently variable band width and center frequency while introducing minimum phase shift and time delay into the signal components outside the frequency band. The adaptive filter comprises a series of variable notch filters and means for independently controlling the center frequencies of the notch filters in accordance with a predetermined parameter of the output signal from the last filter. Also disclosed is a marine vessel position control system wherein the adaptive filter is employed to attenuate undesired signal components arising from alternating wave action.

13 Claims, 4 Drawing Figures

3,867,712

ADAPTIVE FILTER

BACKGROUND OF THE INVENTION

The invention herein described pertains generally to adaptive signal filters, and more specifically to an electronic digital filter for variably attenuating selected signal components in accordance with a predetermined parameter of the filter output signal.

As a result of increasing interest which has developed in exploring for oil and minerals on or beneath the ocean beds at increasing water depths, producing oil and minerals from such locations, and conducting research from stationary locations on very deep waters, it has become necessary to augment or replace conventional vessel anchoring systems with dynamic positioning or station keeping systems. Such dynamic positioning systems are also of interest in many other specific applications in which it is desired to maintain fixed vessel position, or to maneuver the vessel between locations along a predetermined route or in accordance with selected sensed parameters.

A dynamic positioning system basically comprises means for sensing the location and heading of a vessel, means for determining deviation of actual vessel location and heading from its desired position, and means responsive to the determined deviation for returning the vessel to its desired position. Propulsion units alone or in combination with a rudder(s) and/or anchors may be employed to produce the forced required to return the vessel to its desired position. Such propulsion units may comprises thrusters of a fixed azimuth type such as main screws and tunnel thrusters, variable azimuth outboard motor type thrusters, vertical axis propellers of the Voith-Schneider type, or combinations of such thrusters.

During the positioning or station keeping process, the vessel is acted upon and displaced from its desired position by a number of natural forces which are transmitted to the vessel through air and water movements. Certain of the forces, such as those produced by steady wind and/or water currents, are relatively constant. Such forces tend to drive the vessel increasingly further away from its desired position. Other forces, such as are produced by wind gusts and wave action, are alternating in nature. Particularly in connection with wave action, the period of the forces is relatively short and the vessel is continuously driven a short distance away from and then returned to its desired position. Significant energy is contained in the waves. Hence, even though it may be possible to oppose the wave forces with sufficient alternating thrust from the vessel propulsion units to prevent any resulting vessel motion, such operation is not required in most applications, and is grossly inefficient in terms of equipment operation and fuel consumption.

It might be speculated that the previously described problem could be overcome by employing a low pass filter to remove all deviation signal components above a predetermined frequency. However, this solution has been found unsatisfactory for several reasons. One reason is that any signal filtering action tends to alter or degrade components of the signal outside the band of signal components whose attenuation is desired. It has been found that insertion of any conventional low pass filter capable of adequately attenuating the undesired alternating signal components introduces unacceptably large phase shift and time delay into the required portions of the position control signal. Another reason is that the power spectrum of wave forces is exceedingly variable depending upon the causes for the waves and locations of their origination. Variable parameters include both the center frequency of the power spectrum and the frequency band over which it extends.

In order to satisfactorily remove signal components resulting from wave action from the position deviation signal, it has been found necessary to employ a filter which attenuates signal components within a frequency band having independently variable center frequency and band width. It has also been found that the proper center frequency and band width can be determined by analyzing the power spectrum of the filtered signal in accordance with a particular algortihm.

It should be noted that although the disclosed filtering technique and apparatus have been found particularly useful in vessel positioning systems, the concept is of broader utility. It is susceptible of implementation in a variety of ways to meet the requirements of numerous applications requiring unusual versatility in self-adaptive signal filters.

SUMMARY OF THE INVENTION

An adaptive filter in accordance with this invention basically comprises first and second signal filters connected in series, each filter having a transfer characteristic which can be varied in accordance with a suitable control signal. The control signals are generated by computing apparatus which analyzes the output signal from the second signal filter in accordance with a predetermined algorithm. In response to these control signals, the signal filters operate on the incoming signal to produce an output signal having at least one parameter which is characterized in accordance with predetermined criteria. Such characterizing is referred to as optimizing the signal and/or signal parameter(s). The method of this invention basically comprises independently attenuating at least two variable portions of a signal in accordance with control signals which are related to a parameter of the attenuated signal by a predetermined algorithm.

As applied to a dynamic vessel positioning system, the adaptive filter comprises first and second notch filters, each having a variable center frequency. Computing means is provided to analyze the power spectrum of the output signal from the second filter, and to generate control signals suitable for setting the center frequencies of the notch filters so that portions of the output signal in frequency bands below the center frequency of the first notch filter, between the center frequencies of the notch filters, and above the center frequency of the second notch filter each represent one third of the total power.

Accordingly it is a primary object of this invention to provide a very flexible and versatile adaptive filter.

It is a further object to provide a signal filter uniquely adapted for use in an automatic vessel positioning system and capable of satisfactorily attenuating position deviation signal components arising from alternating forces such as wave action.

An additional object is to provide an efficient automatic vessel positioning system which does not respond to short period forces which alternately cause the vessel to move short distance from and then return to its desired position.

Yet another object is to provide a unique signal filtering method whereby versatile adaptive signal filtering can be achived.

Other objects of this invention will become apparent from a study of the following description, drawings and claims.

DESCRIPTION OF THE PREFERRED EMBODIMENT

Figure 1:
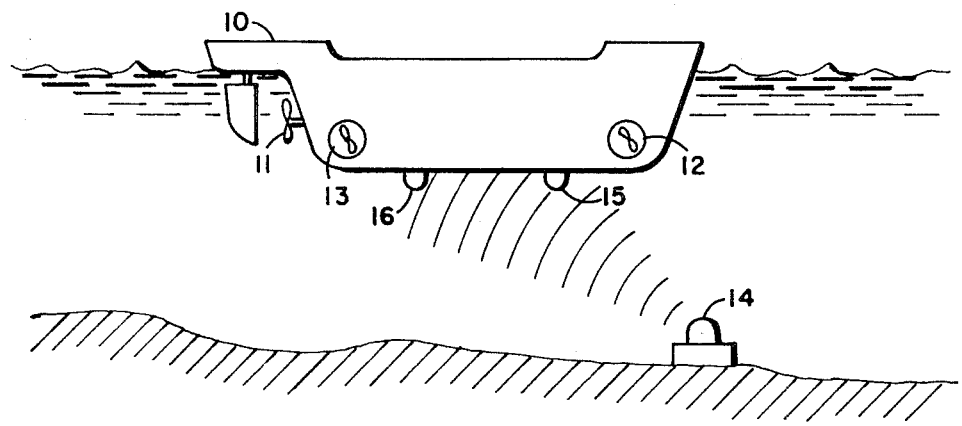
FIG. 1 is schematic illustration of a vessel employing automatic station keeping or positioning apparatus in which the present adaptive filter can be advantageously used.
Figure 2:
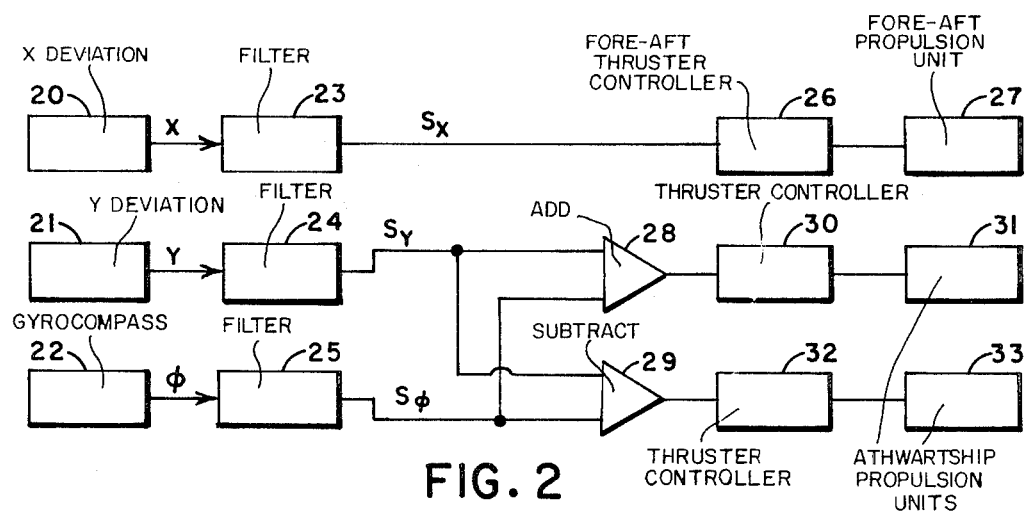
FIG. 2 is a simplified block diagram of the automatic station keeping apparatus employed on the vessel of FIG. 1.

FIGS. 1 and 2 illustrate the basic features of an automatic vessel positioning system in which the applicants' unique adaptive filter may be used to facilitate efficient vessel positioning. In FIG. 1, reference number 10 identifies a floating vessel designed and equipped to perform an activity which requires that it be maintained at a fixed horizontal position relative to a point of interest. Examples of such activities include underwater oil well drilling and salvage operations. In these examples, the points of interest are the underwater well head and the object being salvaged respectively.

Vessel 10 is shown equipped with a mian screw 11 and a pair of fixed azimuth transverse thrusters 12 and 13 which are respectively located fore and aft of the center of rotation of the vessel. For illustrative purposes, thrusters 12 and 13 are shown as tunnel thrusters. It will be appreciated that propulsion units located as shown can be used to horizontally position vessel 10 both as to location and heading. Although fixed azimuth thrusters such as main screw 11 and transverse thrusters 12 and 13 are shown in FIG. 1, other types and configurations of propulsion units may be employed equally as well to perform the required function. Such propulsion unit arrangements may include variable azimuth outboard motor type units and Voith-Schneider units, as well as various combinations of different types of units.

Propulsion units 11, 12, and 13 are controlled in response to signals derived from sensed deviation of vessel 10 from a desired location and heading. Heading can be sensed by means of a gyrocompass, magnetic compass, or any other suitable heading sensor. Horizontal location in two vertical planes may be sensed by means of acoustic position indicating apparatus, as illustrated in FIG. 1, or by means of any other suitable position indicating equipment. For simplicity, only the portion of an acoustic position indicating system for sensing location along the fore-aft vessel axis will be described. Location along an athwartship axis can be analogously determined. For purposes of the following description, the fore-aft and athwartship axes will be designated as X and Y axes, respectively.

The simplified acoustic position indicating system shown in FIG. 1 comprises an acoustic beacon 14 which is located in a fixed positional relationship with the point of interest. Beacon 14 transmits a periodic acoustic signal which is received by listening hydrophones 15 and 16, mounted in a spaced relationship on vessel 10. The horizontal location of vessel 10 relative to beacon 14 along the X axis is computed from differences in arrival times at hydrophones 15 and 16 of a transmitted acoustic signal. Vessel location along the Y axis may be similarly determined by means of a pair of vessel mounted hydrophones spaced along a line perpendicular to the line joining hydrophones 15 and 16. Position indicating equipment operating in accordance with this principle is disclosed in detail in U.S. Pat. No. 3,3559,161, filed June 28, 1968, for Acoustic Position Reference System in the name of Ilmar G. Raudsep, and assigned to the same assignee as the present application.

In the block diagram of FIG. 2, blocks identified by reference numerals 20 and 21 represent apparatus for determining vessel deviation from its desired location along the X and Y axes respectively. Such deviation sensing apparatus may comprise the previously described acoustic position indicating equipment. It produces a pair of signals, identified by symbols $x$ and $y$ respectively, indicative of vessel deviation from its desired location along the X and Y axes. A block identified by reference numeral 22 represents apparatus for sensing vessel heading, such as a gyrocompass. It produces a signal, identified by symbol $\phi$, indicative of vessel deviation from its desired heading.

Deviation of vessel 10 from its desired position results from combined action of water flow, waves and wind. In general, the combined forces result in movement of the vessel characterized by a substantially steady drift and a superimposed oscillating to and fro motion. The oscillating motion results primarily from wave action. Both the steady drift and oscillating movements are reflected in signals $x$, $y$, and $\phi$. Absent some means for modifying these deviation signals, both the steady and oscillating signal components are transmitted to controllers for the propulsion units. The propulsion units, in turn, would respond by producing oscillating thrusts in opposition to vessel movements resulting from wave action. In view of the substantial forces which can be exerted by the waves, substantial power would be required from the thrusters to counteract wave action.

However, wave action generally has no net effect on the vessel position, and in most applications the relatively small vessel movement produced thereby does not pose a significant problem. Hence, it is desirable to substantially reduce or eliminate the oscillating component from deviation signals $x$, $y$, and $\phi$ so as to eliminate thruster responses to these components, thereby increasing thruster efficiency and decreasing equipment wear and fuel consumption. Signal filters in accordance with the applicants' invention have been found highly satisfactory for this purpose.

As shown in FIG. 2, deviation signals $x$, $y$, and $\phi$ are supplied respectively to adaptive filters identified by reference numerals 23, 24, and 25. These filters operate as will hereinafter be described in greater detail to substantially reduce the oscillating components in signals $x$, $y$, and $\phi$, and to produce corresponding modified deviation signals $S_x$, $S_y$, and $S\phi$ suitable for efficient control of the vessel thrusters.

Signal $S_r$ is supplied to a fore-aft thruster controller 26 which produces a suitable control signal for a fore-aft propulsion unit 27 corresponding to main screw 11 in FIG. 1. Signal $S_y$ is supplied to a pair of summing circuits 28 and 29. Circuits 28 and 29 are also supplied with signal $S_\phi$. Circuit 28 functions to add signals $S_y$ and $S_\phi$ and supply the summed signal to a thruster controller 30 which controls a first athwartship propulsion unit 31 corresponding to tunnel thruster 12. Circuit 29 functions to subtract signal $S_\phi$ from signal $S_y$ and supply the difference signal to a thruster controller 32 which controls a second athwartship propulsion unit 33 corresponding to tunnel thruster 13. Propulsion units 31 and 33 together provide sufficient thrust to maintain the vessel at its desired location along the Y axis. The difference between the thrusts produced by propulsion units 31 and 33 provide a moment sufficient to maintain the vessel at its desired heading.

Figure 3:
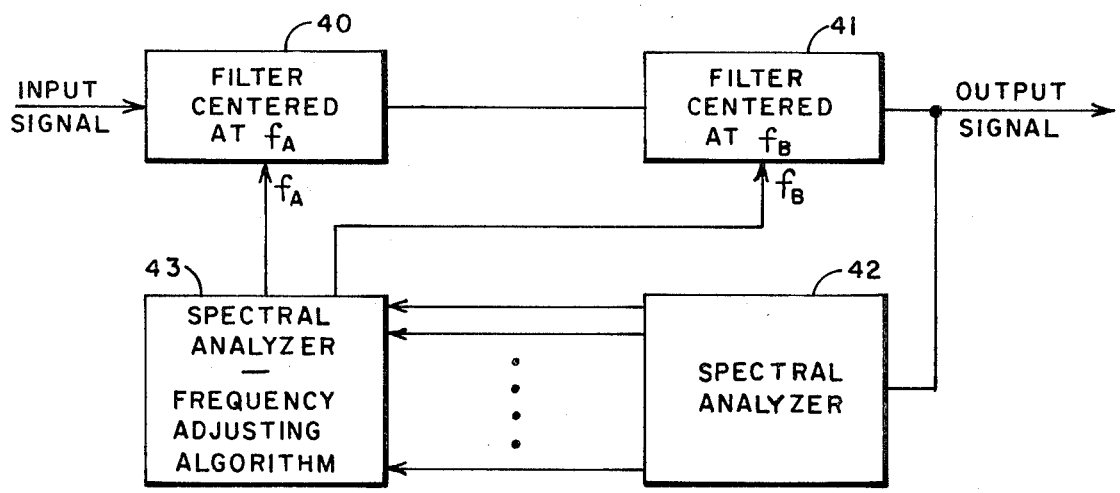
FIG. 3 is a simplified block diagram of the applicants' unique adaptive filter.

An adaptive filter in accordance with the applicants' invention is shown in block diagram form in FIG. 3. This adaptive filter comprises first and second variable signal filters 40 and 41. Filters 40 and 41 are connected in series. An incoming signal is supplied to the input of filter 40. The filtered signal is produced at the output of filter 41. As indicated, the operations of filters 40 and 41 are centered respectively at frequencies $f_A$ and $f_B$. These center frequencies are variable in accordance with appropriate frequency control signals.

The frequency control signals are generated by means of a computer which analyzes the output signal from filter 41 in accordance with a predetermined algorithm. The computer comprises a spectral analyzer 42 which analyzes the output signal from filter 41 and produces a plurality of signals indicative of a spectrum of the output signal. The signals from spectral analyzer 42 are supplied to a spectral integrator and frequency adjusting computer 43 which updates the frequency control signals so as to center the operation of filters 40 and 41 at frequencies in accordance with a predetermined algorithm.

For wave filtering applications it has been found that oscillating signal components due to wave action can be adequately attenuated by varying center frequencies $f_A$ and $f_B$ so that one-third of the total power represented by the output signal from filter 41 falls in a frequency band below frequency $f_A$, one-third falls in the frequency band between frequencies $f_A$ and $f_B$, and one-third falls in a frequency band above frequency $f_B$. In addition to having the capability of following the power spectrum of sea waves, which is variable over an extended range of center frequencies and frequency band widths, this filter introduces minimum phase shift and time delay into the required portions of the filtered signal.

Figure 4:
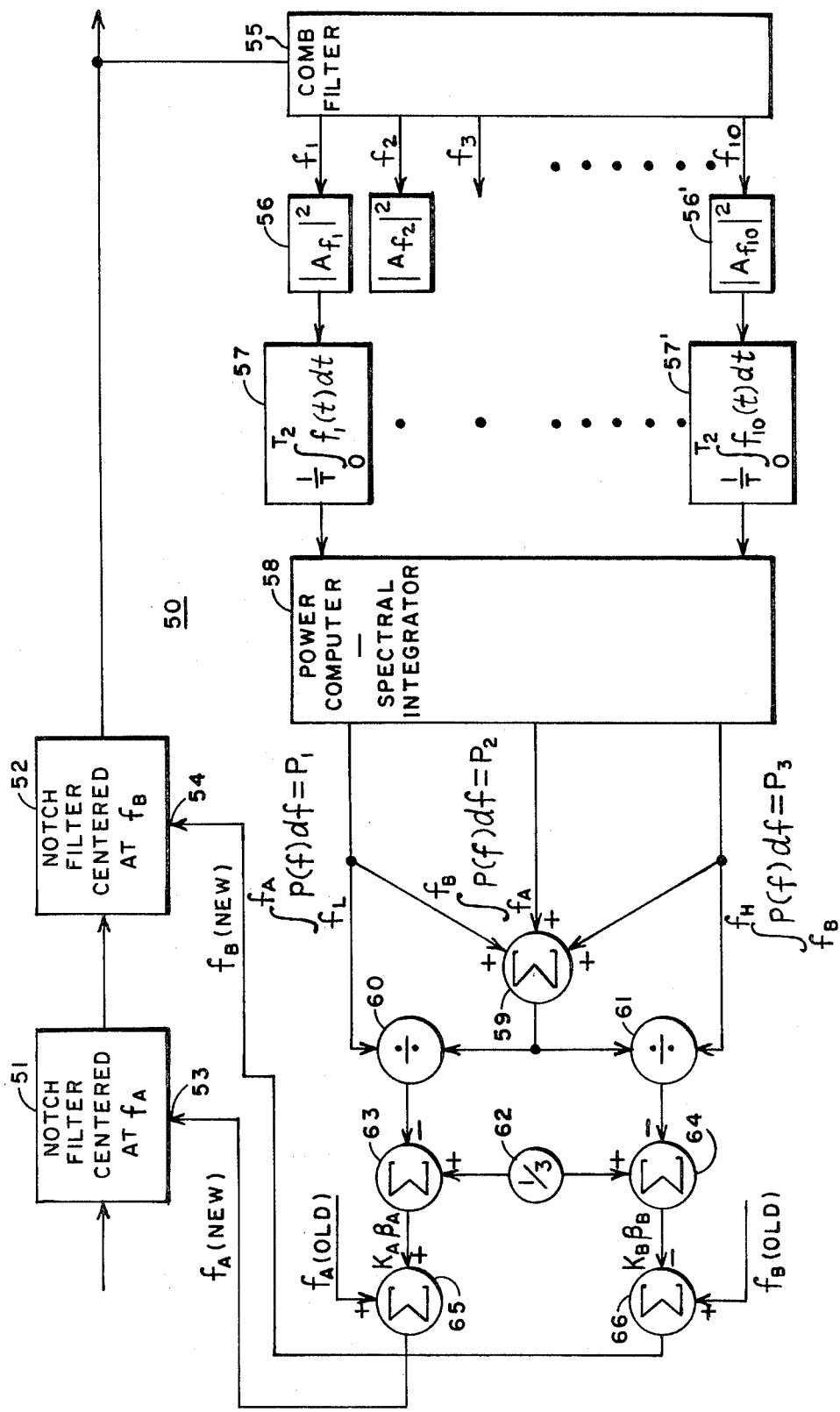
FIG. 4 is a schematic illustration of the operations carried out in the adaptive filter of FIG. 3 and the calculating units used to perform such operations.

An embodiment of the applicants' adaptvie signal filter implemented to operate according to this criteria is illustrated in FIG. 4, wherein it is generally identified by reference numeral 50. Adaptive filter 50 comprises first and second notch filters 51 and 52 which respectively attenuate signal components in frequency bands centered at frequencies $f_A$ and $f_B$. Notch filters 51 and 52 are connected in series. Center frequencies $f_A$ and $f_B$ are variable and are controlled in response to suitable center frequency control signals supplied to frequency control inputs 53 and 54 respectively. An incoming signal, such as is produced by the previously described vessel locations or heading indicating equipment, is supplied to notch filter 51. Notch filter 52 provides a filtered output signal in which alternating components arising from wave action have been attenuated. This signal provides for efficient operation of following portions of a marine vessel positioning system in which the adaptive filter is employed.

Center frequencies $f_A$ and $f_B$ are determined in accordance with a frequency adjusting algorithm which is based upon minimization of the integral of the output power in a frequency band between lower and upper frequency limits. The frequency limits are preselected to include the band of frequencies in which wave action occurs. However, lower frequency limit is higher than the frequency of position deviation which must be counteracted by the vessel propulsion units. The output power integral is as follows:

$$P_{out} = \int_{f_L}^{f_H} |H(f_A, \omega)|^2 |H(f_B, \omega)|^2 S(\omega) d\omega \qquad (1)$$

where $H(f,\omega)$ is a function of frequency and band width. Minimization is performed with respect to frequencies corresponding to center frequencies $f_A$ and $f_B$ of notch filters 51 and 52. The minimization requires both:

$$\frac{\partial P_{out}}{\partial f_A} = 0 = \int_{f_L}^{f_H} |H(f_A, \omega)|^2 |H(f_B, \omega)|^2 S(\omega) W(f_A, \omega) d\omega \qquad (2)$$

$$\frac{\partial P_{out}}{\partial f_B} = 0 = \int_{f_L}^{f_H} |H(f_A, \omega)|^2 |H(f_B, \omega)|^2 S(\omega) W(f_B, \omega) d\omega \qquad (3)$$

The function $W(f,\omega)$ depends upon the transfer function of the notch filters. The integrals of equations (2) and (3) can be computed approximately if the output power spectrum of the signal from notch filter 52 and the function $W(f,\omega)$ are known.

The above mathematical computations can be accomplished by applying the output signal of notch filter 52 to a comb filter 55. Comb filter 55 produces a plurality of signals identified by symbols $f_1$ through $f_{10}$. The amplitudes of these signals are indicative of the magnitudes of the components of the output signal in bands centered on corresponding center frequencies. Note that the particular number of bands on which comb filter 55 operates is not critical. More or fewer bands may be used depending on the relative importances of high signal resolution and equipment simplicity.

Signals $f_1$ through $f_{10}$ are each squared by one of squaring means 56 through 56'. Each squared signal is then integrated with respect to time in one of integrating means 57 through 57' to obtain power signals corresponding to signals $f_1$ through $f_{10}$. The power signals are supplied to a power computer/spectral integrator 58 which functions to sum the power signals so that the total power is represented by three partial power signals. More specifically, power computer 58 produces a first partial power signal $P_1$ indicative of power in a frequency band below frequency $f_A$, a second partial power signal $P_2$ indicative of power in a frequency band between frequencies $f_A$ and $f_B$, and a third partial power $P_3$ indicative of power in a frequency band above frequency $f_B$.

Partial power $P_1$ is computed by summing the powers represented by power signals corresponding to all frequency bands from comb filter 55 which lie completely below frequency $f_A$, and adding to the summation the power corresponding to the fraction of the band containing frequency $f_A$ which lies below frequency $f_A$. Similarly, partial power $P_2$ is computed by summing the powers corresponding to all frequency bands from comb filter 55 which lie completely between frequencies $f_A$ and $f_B$, and adding to the summation fractional powers corresponding to the fractions of the frequency bands containing frequencies $f_A$ and $f_B$ which lie between those frequencies. Partial power $P_3$ is computed in an analogous manner.

Partial powers $P_1$, $P_2$, and $P_3$ are summed in a summing means 59 to obtain the total power. In addition, partial power $P_1$ is divided by the total power in a first dividing means 60 which produces a first fraction indicative of the portion of the total power represented in the frequency band below frequency $f_A$. Partial power $P_3$ is similarly divided by the total power in a second dividing means 61 to produce a second fraction indicative of the portion of the total power represented in the frequency band above frequency $f_B$. The first and second fractions are each subtracted from the fraction one-third, as indicated at 62, by summing means 63 and 64 respectively. The difference between the first fraction and the fraction one-third comprises an error signal $\beta_A$ which is used for updating the frequency control signal for notch filter 51 and the $f_A$ integration limit for power computer 58. More specifically, error signal $\beta_A$ is scaled by a factor $K_A$ and added to a signal representing $f_A$ (old) in a summing means 65 to provide an updated frequency control signal $f_A$ (new) which resets the center frequency of notch filter 51 and the $f_A$ integration limit in power computer 58. Similarly, summing means 64 produces an error signal $\beta_B$ which is scaled by a factor $K_B$ and subtracted from an existing frequency control signal $f_B$ (old) in a summing means 66 to produce an updated frequency control signal $f_B$ (new). This signal is used to update the center frequency of notch filter 52 and $f_B$ integration limit in power computer 58.

In one highly satisfactory digital embodiment of the adaptive filter illustrated in FIG. 4, a sampling rate of two samples per second was used and the notch filter center frequencies were updated every 100 samples. Thus, new input data was provided every one-half second, and center frequencies of notch filters 51 and 52 were updated every 50 seconds. The adaptive filter was found to rapidly converge on the frequencies dictated by the previously described power spectrum criteria. A unique solution was provided under all operating conditions.

Although a specific embodiment of an adaptive signal filter in accordance with the present invention is shown for illustrative purposes, other embodiments which do not depart from the applicants' contemplation and teaching will be apparent to those skilled in the art. The applicants do not intend to be limited to the disclosed embodiment, but only by the terms of the appended claims.

What is claimed is:

1. A filter for blocking signal components within a frequency band having independently variable band width and center frequency comprising:

first and second notch filters, each having a center frequency which is variable in response to a frequency control signal;

means for connecting said first and second notch filters in series;

means for supplying an incoming signal having frequency components between lower and upper frequency limits to said first notch filter;

computing means for accepting an input signal and determining first and second frequencies such that the powers represented by portions of the input signal in frequency bands lying between pairs of the lower frequency limit, the first frequency, the second frequency and the upper frequency limit are related in accordance with predetermined criteria;

means for supplying the output signal of said second notch filter to said computing means as the input signal; and means for supplying signals indicative of the first and second frequencies respectively as the frequency control signals of the said first and second notch filters.

2. The filter of claim 1 wherein said computing means determines the first and second frequencies such that equal powers are represented by portions of the input signal in frequency bands bounded by the lower frequency limit and the first frequency, the first and second frequencies, and the second frequency and the upper frequency limit.

3. In a system for dynamically controlling the position of a water craft which is subject to long term displacement forces caused by water flow and wind and shorter term alternating displacement forces caused by wave action, and wherein the shorter term displacement forces have frequencies between lower and upper frequency limits, the system including sensing means for producing a signal indicative of deviation of the craft from a specified position, propulsion means, signal processing means for producing a control signal indicative of substantially only that portion of the deviation signal which results from the long term displacement forces, and means for supplying the control signal to the propulsion means so that the propulsion means tends to reduce deviation of the craft from the specified position, an improved wave filter which comprises:

first and second notch filters, each having a variable center frequency between the lower and upper frequency limits;

means for connecting said first and second notch filters in series;

means for supplying a signal indicative of the deviation signal to the input of said first notch filter;

computing means for accepting an input signal having frequency components between the lower and upper frequency limits and determining first and second frequencies such that the powers resulting in portions of the input signal in first, second and third frequency bands respectively bounded by the lower frequency limit and the first frequency, the first and second frequencies, and the second frequency and the upper frequency limit are related in accordance with predetermined criteria;

means for connecting said second notch filter to said computing means so as to supply the input signal thereto; and means for setting the center frequencies of said first and second notch filters at the first and second frequencies respectively.

4. The invention of claim 3 wherein said computing means determines the first and second frequencies such that equal powers result in portions of the input signal in the first, second and third frequency bands.

5. The invention of claim 3 wherein said computing means comprises:
   a power computer for determining the total power in the input signal;
   means for computing a first power in the portion of the input signal in the first frequency band;
   means for dividing the first power by the total power to obtain a first quotient;
   means for computing a second power in the portion of the input signal in the third frequency band;
   means for dividing the second power by the total power to obtain a second quotient;
   means for subtracting the first quotient from a first predetermined fraction to obtain a first error signal;
   means for subtracting the second quotient from a second predetermined fraction to obtain a second error signal;
   means for adding the first error signal to a signal indicative of the first frequency to provide an updated frequency control signal for setting the center frequency of said first notch filter; and
   means for subtracting the second error signal from a signal indicative of the second frequency to provide an updated frequency control signal for setting the center frequency of said second notch filter.

6. The filter of claim 5 wherein said first and second predetermined fractions are each one third.

7. The filter of claim 5 wherein said power computer comprises:
   a comb filter for producing a plurality of signals respectively indicative of the amplitudes of portions of the input signal in a plurality of frequency bands;
   means for squaring each of said plurality of signals;
   means for integrating each of a plurality of squared signals with respect to time to obtain a plurality of power signals indicative of the powers represented in each of said plurality of frequency bands; and
   means for summing the plurality of power signals to determine the total power.

8. The filter of claim 7 wherein:
   said means for computing the first power comprises means for summing the power signals in bands of said plurality of frequency bands bounded by frequencies lower than the first freqeucny and a portion of the power signal in the band containing the first frequency, the portion being proportional to the portion of the band below the first frequency; and
   said means for computing the second power comprises means for summing the power signals in bands of said plurality of frequency bands bounded by frequencies higher than the second frequency and a portion of the power signal in the band containing the second frequency, the portion being proportional to the portion of the band above the second frequency.

9. An adaptive filter for attenuating components of a signal in accordance with at least one signal parameter comprising:
   a plurality of signal filters, each having a signal transfer characteristic which is variable in response to a control signal, the variable transfer characteristic being suitable for optimizing a predetermined signal parameter;
   means for connecting said plurality of signal filters in series;
   means for supplying an incoming signal to the input of the first filter in said series;
   computing means for analyzing a signal and producing control signals for causing said plurality of filters to optimize the predetermined signal parameter;
   means for supplying the output signal of the last filter in said series to the input of said computing means; and
   means for supplying the control signals produced by said computing means to said plurality of signal filters so as to independently vary the transfer characteristics of at least two filters.

10. The adaptive filter of claim 9 wherein:
    said plurality of signal filters comprises first and second notch filters, each capable of attenuating signal components in a frequency band whose center frequency is variable in response to a control signal; and
    said computing means produces control signals suitable for varying the center frequencies of said first and second notch filters so that equal powers are represented by portions of the output signal from second notch filter in frequency bands below the center frequency of said first filter, between the center frequencies of said first and second filters, and above the center frequency of said second filter respectively.

11. The filter of claim 10 wherein said computing means comprises:
    a spectral analyzer for producing a plurality of sample power signals each indicative of the power represented by signal components in a frequency band of the output signal from said second notch filter;
    means for summing all sample power signals to produce a total power signal;
    means for summing complete and fractional sample power signals at frequencies less than the center frequency of said first notch filter to produce a first partial power signal;
    means for summing complete and fractional sample power signals at frequencies greater than the center frequency of said second notch filter to produce a second partial power signal; and
    summing means for combining the total and first and second partial power signals to produce error signals for updating the control signals for said first and second notch filters.

12. A method for optimizing a signal comprising the steps of:
    attenuating a variable portion of an input signal to produce a first intermediate signal;
    attenuating a variable portion of the first intermediate signal to produce a second intermediate signal;
    generating first and second control signals related to the second intermediate signal in accordance with predetermined criteria; and
    independently varying the attenuated portions of the input and first intermediate signals in accordance with the first and second control signals respectively.

13. The method of claim 12 wherein:
the steps of attenuating variable portions of the input and first intermediate signals comprise attenuating frequency bands centered on first and second variable center frequencies respectively; and
the step of generating first and second control signals comprises generating signals suitable for controlling the first and second center frequencies so that equal powers are represented by portions of the second intermediate signal in frequency bands below the first center frequency, between the first and second center frequencies, and above the second center frequency.

* * * * *